US005501494A

United States Patent [19]

Willetts

[11] Patent Number: 5,501,494

[45] Date of Patent: Mar. 26, 1996

[54] PORTABLE DOOR LOCK SUITABLE FOR USE BY PEOPLE OF ALL AGES

[76] Inventor: Thomas Willetts, 8 Camelot La., St. James, N.Y. 11780

[21] Appl. No.: 304,395

[22] Filed: Sep. 12, 1994

[51] Int. Cl.$^{6}$ .................................................... C05C 17/04

[52] U.S. Cl. ..................... 292/262; 292/288; 292/DIG. 2

[58] Field of Search .................................... 292/264, 288, 292/248, 347, DIG. 2, 1; 70/416, 417; 273/55, 58 C, 428; 446/247, 255

[56] References Cited

U.S. PATENT DOCUMENTS

| | | | |
|---|---|---|---|
| 3,451,708 | 6/1969 | Brooks | 292/264 |
| 3,782,149 | 1/1974 | Carter | 292/DIG. 2 X |
| 3,836,187 | 9/1974 | Buettner | 292/264 X |
| 4,022,503 | 5/1977 | Bey | 292/264 |
| 5,004,279 | 4/1991 | Radcliff | 292/288 |
| 5,029,916 | 7/1991 | Chiu | 292/DIG. 2 X |

FOREIGN PATENT DOCUMENTS

| | | | |
|---|---|---|---|
| 0008480 | 1/1990 | Japan | 292/288 |

*Primary Examiner*—Steven N. Meyers
*Assistant Examiner*—Monica E. Millner
*Attorney, Agent, or Firm*—Galgano & Burke

[57] ABSTRACT

A portable door lock includes an interior member and an exterior member which are connected to each other by a cord. The interior member is slidable along the cord and the cord is provided with a stopping member which is engageable by the interior member to prevent movement of the interior member along the cord away from the exterior member. In a first embodiment, the interior and exterior members are spheres and the stopping member is a knot and a washer. The interior sphere is substantially hollow and has a through bore with a key hole for engaging the washer. The cord is provided with a loop adjacent the exterior sphere for hanging the exterior sphere on an exterior door knob. In a second embodiment, the exterior member is a truncated hollow sphere which is dimensioned to fit over an exterior door knob. The strength of the lock is dependent on the materials chosen, but should be sufficient to be impenetrable by children, but easy for an adult to break.

11 Claims, 3 Drawing Sheets

PORTABLE DOOR LOCK SUITABLE FOR USE BY PEOPLE OF ALL AGES

BACKGROUND OF THE INVENTION

1. Field of the Invention

The invention relates to a removable and portable door lock. More particularly, the invention relates to a removable, portable door lock which is especially suitable for use with children.

2. State of the Art

Door locks provide privacy and security but present a potential hazard in the case of an emergency such as a fire. Locked doors can delay or even prevent rescue during an emergency. This potential hazard is most serious in children's rooms. For this reason, it is generally advantageous to omit locks from the doors to children's rooms. Nevertheless, there are times when children desire a certain degree of privacy, particularly from siblings, which would otherwise be provided by a door lock. These conflicting needs for privacy and safety have not been addressed in the art of door locks.

SUMMARY OF THE INVENTION

It is therefore an object of the invention to provide a removable, portable door lock which is suitable for use by people of all ages and which is especially intended for use with children.

It is also an object of the invention to provide a removable, portable door lock which affords a child a certain degree of privacy while at the same time avoids the hazards associated with door locks.

It is another object of the invention to provide a removable, portable door lock which is easy for a child to use.

It is still another object of the invention to provide a removable, portable door lock which is inexpensive to manufacture.

It is also an object of the invention to provide a removable, portable door lock which operates to deter entry to a room but which does not prevent entry in the case of emergency.

In accord with these objects which will be discussed in detail below, the removable, portable door lock of the present invention includes an interior member and an exterior member which are connected to each other by a cord. The interior member is slidable along the cord and the cord is provided with a stopping member which is engageable by the interior member to prevent movement of the interior member along the cord away from the exterior member.

According to a first embodiment of the invention, the interior and exterior members are spheres and the stopping member is a knot and a washer. The interior sphere is substantially hollow and has a through bore with a key hole for engaging the washer. The cord is provided with a loop adjacent the exterior sphere for hanging the exterior sphere on an exterior door knob. The door lock operates by hanging the exterior sphere on the external door knob with the cord loop, holding the interior sphere near the interior door knob so that the cord extends over the door edge between the interior and exterior door knobs. After the door is closed, the interior sphere is slid along the cord toward the exterior sphere. The washer is preferably located on the cord at a distance from the exterior sphere which places it close to the interior surface of the door. When the interior sphere is as close to the interior surface of the door as possible, the washer is engaged by the keyhole of the interior sphere. When arranged in this manner, the spheres prevent the door from opening without breaking the cord. The strength of the materials used will determine the strength of the door lock. Typically, the door lock will be strong enough to prevent children from opening the door, but not so strong as to prevent an adult from breaking the cord or the cord's attachment to one or both of the spheres.

According to a second embodiment of the invention, the exterior member is a truncated hollow sphere which is dimensioned to fit over an exterior door knob. The interior member is substantially the same as in the first embodiment. The cord connecting the spheres is not provided with a loop as in the first embodiment. The second embodiment of the door lock operates by placing the exterior truncated hollow sphere over the exterior door knob, holding the interior sphere near the interior door knob so that the cord extends over the door edge between the interior and exterior door knobs. After the door is closed, the interior sphere is slid along the cord toward the exterior sphere. The washer is preferably located on the cord at a distance from the exterior sphere which places it close to the interior surface of the door. When the interior sphere is as close to the interior surface of the door as possible, the washer is engaged by the keyhole of the interior sphere. When arranged in this manner, the exterior hollow truncated sphere prevents grasping and turning of the exterior door knob. The interior sphere and the cord connecting the spheres prevents the exterior hollow truncated sphere from being removed from the exterior door knob without breaking the cord or the cord's attachment to one or both of the spheres.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
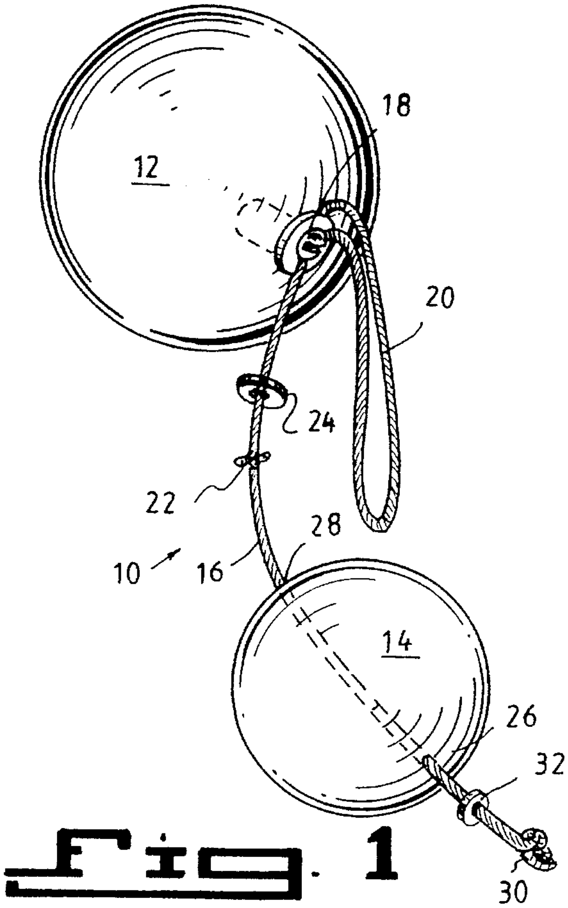
FIG. 1 is a perspective view of a first embodiment of the door lock according to the invention.
Figure 2:
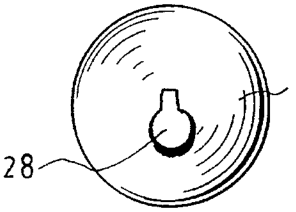
FIG. 2 is a perspective view of the distal end of the interior sphere of the lock of FIG. 1.
Figure 3:
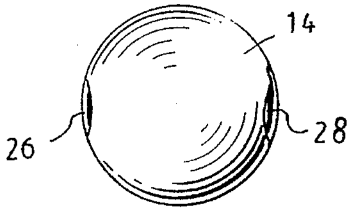
FIG. 3 is a perspective view of the side of the interior sphere of the lock of FIG. 1.
Figure 4:
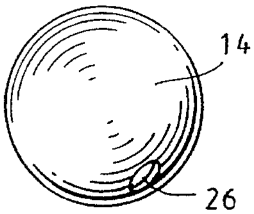
FIG. 4 is a perspective view of the proximal end of the interior sphere of the lock of FIG. 1.

Referring now to FIGS. 1 through 4, a first embodiment of the removable, portable door lock 10 according to the invention includes an exterior sphere 12, an interior sphere 14, and a connecting cord 16. The spheres 12, 14 are preferably hollow and made of relatively rigid material so that they are not easily deformed. One end of the cord 16 is coupled to the exterior sphere 12 by a toggle bolt or rivet 18. A loop 20 is preferably provided in the cord 16 adjacent to the exterior sphere 12. A first knot 22 is provided in the cord 16 at a distance from the exterior sphere 12 which is slightly longer than the width of a typical door as will be explained in more detail below with reference to FIGS. 5–7. A first washer 24 is preferably provided on the cord 16 between the exterior sphere 12 and the knot 22. The interior sphere 14 has a pair of diametrically opposed holes 26, 28. The cord 16 extends through both holes 26, 28 and has a second knot 30 at or near its end. A second washer 32 is preferably provided on the cord 16 between the second knot 30 and the interior sphere 14. The hole 26 and the washer 32 are dimensioned to prevent the sphere 14 from being removed from the cord 16. As seen best in FIG. 2, the hole 28 is a keyhole which is dimensioned to allow the interior sphere 14 to be moved along the cord 16 between the second washer 32 and the exterior sphere 12 and to engage the first washer 24 as will be described in more detail below.

Figure 5:
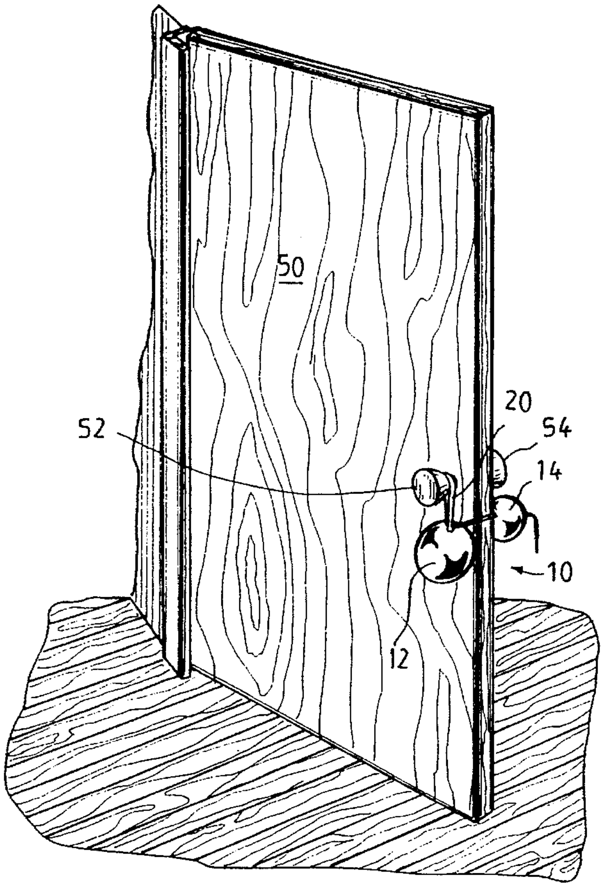
FIG. 5 is a broken perspective exterior view of a door with the lock of FIG. 1 attached to the door.
Figure 7:
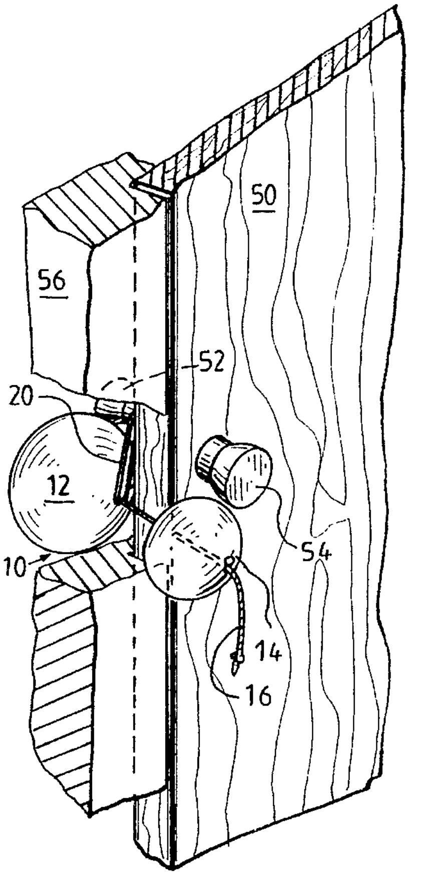
FIG. 7 is a broken perspective interior view of a door with the lock of FIG. 1 attached to and locking the door.
Figure 6:
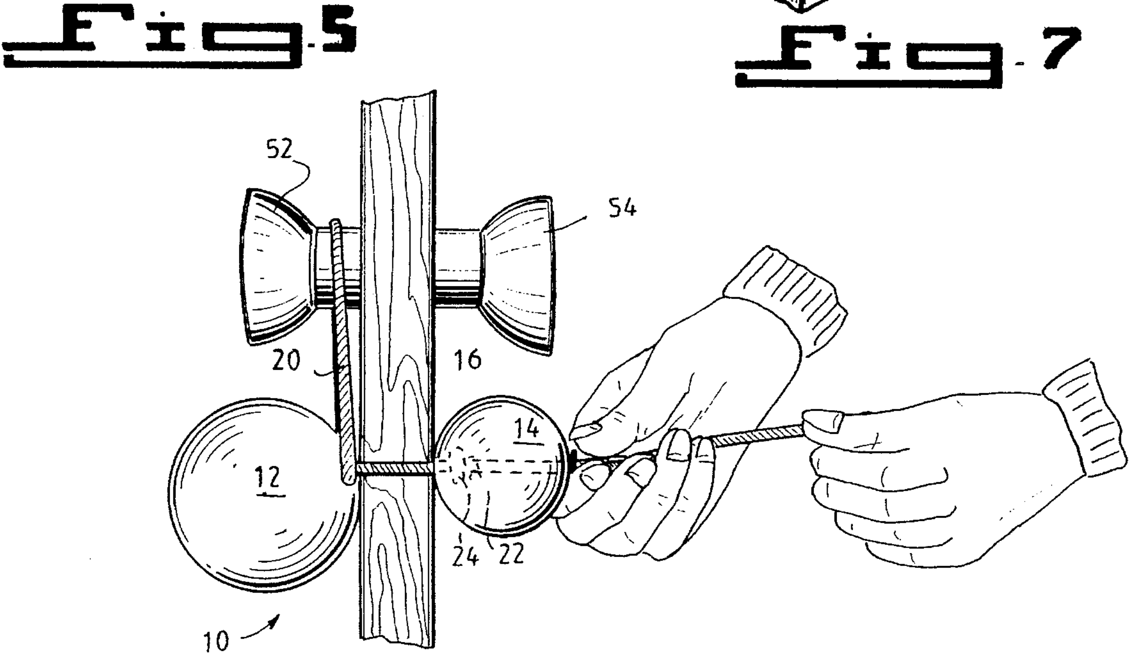
FIG. 6 is a broken side view of a door with the lock of FIG. 1 being attached to the door.

Turning now to FIGS. 5 through 7, the first embodiment 10 of the portable door lock operates as follows: The loop 20 which is adjacent the exterior sphere 12 is placed over the exterior door knob 52 of a door 50 and the interior sphere 14 is held near the interior door knob 54 of the door 50 while the door is opened. The door 50 is then closed slowly so that the exterior sphere 12 remains on the exterior side of the door 50, the interior sphere 14 remains on the interior side of the door 50, and the cord 16 extends through the space between the door 50 and the door jamb 56. After the door 50 is closed, the cord 16 is pulled to bring the exterior sphere 12 close up against the exterior surface of the door 50 and the door jamb 56. The first washer 24 and the first knot 22 are then preferably located close to the interior side of the door 50 and the door jamb 56 with the cord 16 relatively taut relative to the exterior sphere 12. The interior sphere 14 is then slid along the cord 16 until the keyhole 28 in the sphere 14 engages the first washer 24. Those skilled in the art will appreciate that engagement of the keyhole 28 with the washer 24 is accomplished by placing the hole 28 over the washer 24 and turning the ball slightly. (See also FIGS. 9 and 10 discussed below.) When the spheres 12 and 14 are thus arranged, as seen best in FIG. 7, the door 50 cannot be opened without breaking the lock 10 because the spheres 12 and 14 abut both the door 50 and the door jamb 56 and are relatively immovable with respect to each other. While the lock 10 is shown in FIGS. 5 through 7 on a door 50 which opens inward, those skilled in the art will appreciate that the lock 10 will operate in the same manner with a door which opens outward. It will also be appreciated that while the interior and exterior members shown in lock 10 are preferably spheres, objects of other shape may also be as effective. Spheres are preferable for use by children since sharp edges are avoided. It will further be appreciated that while the lock 10 is effective in hampering the opening of the door 50, its efficacy is limited by the tensile strength of the cord 16 and the strength of the cord couplings to the spheres. Therefore, while the lock 10 may be virtually 100% effective in preventing a child from opening the door, it may be easily broken by an adult in the case of an emergency.

Figure 8:
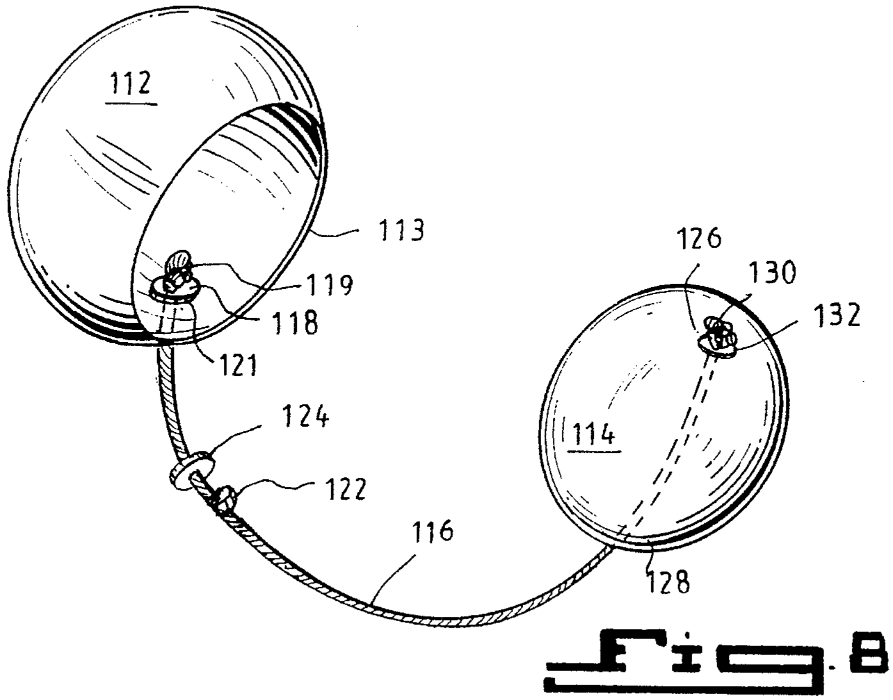
FIG. 8 is a perspective view of a second embodiment of the door lock according to the invention.

FIG. 8 shows a second embodiment of the portable door lock 100 according to the invention includes an exterior hollow truncated sphere 112, an interior sphere 114, and a connecting cord 116. The spheres 112, 114 are preferably made of relatively rigid material so that they are not easily deformed. The interior sphere 114 is substantially the same as the interior sphere 14 of the first embodiment described above. The exterior sphere 112 is truncated with a relatively large circular opening 113. One end of the cord 116 is coupled to the exterior sphere 112 by passing through a relatively small hole 121 in the sphere 112 and being provided with a first washer 118 and a first knot 119 interior of the hole 121. A second knot 122 is provided in the cord 116 at a distance from the exterior sphere 112 which is slightly longer than the width of a typical door as will be explained in more detail below with reference to FIGS. 9 and 10. A second washer 124 is preferably provided on the cord 116 between the exterior sphere 112 and the second knot 122. The interior sphere 114 has a pair of diametrically opposed holes 126, 128. The cord 116 extends through both holes 126, 128 and has a third knot 130 at or near its end. A third washer 132 is preferably provided on the cord 116 between the third knot 130 and the interior sphere 114. The hole 126 and the washer 132 are dimensioned to prevent the sphere 114 from being removed from the cord 116. The hole 128 is a keyhole which is dimensioned to allow the interior sphere 114 to be moved along the cord 116 between the second washer 132 and the exterior sphere 112 and to engage the second washer 124 as will be described in more detail below.

Figure 9:
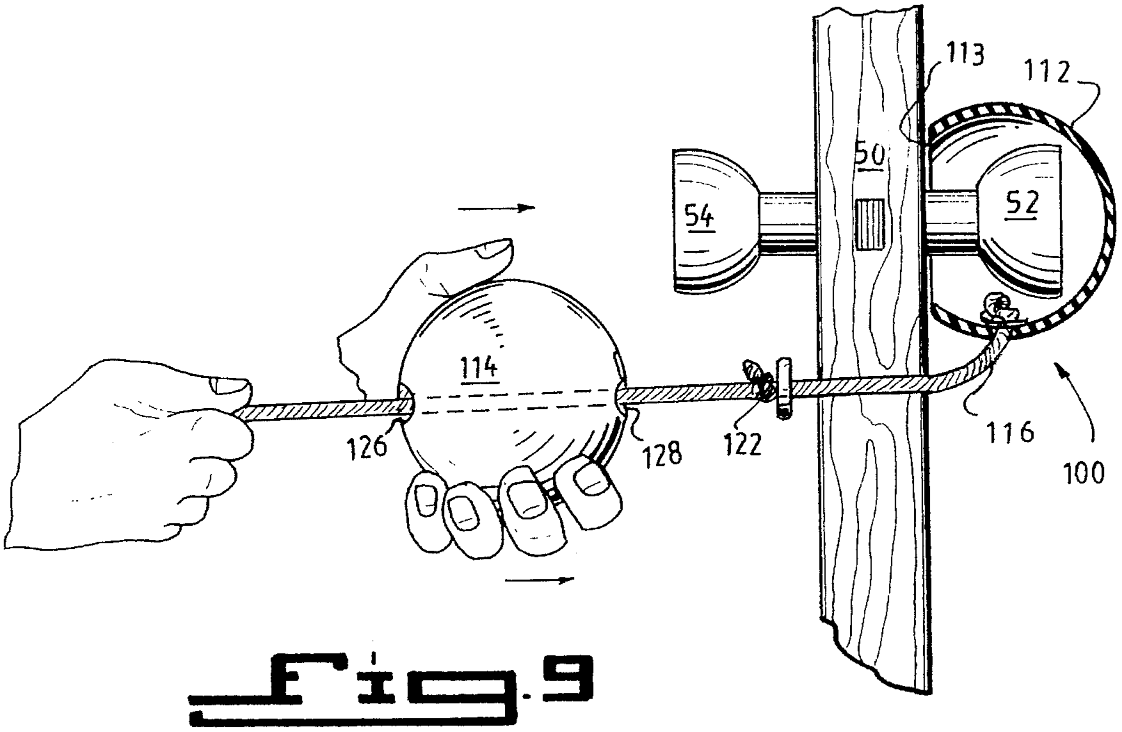
FIG. 9 is a broken side view of a door with the lock of FIG. 8 being attached to the door.
Figure 10:
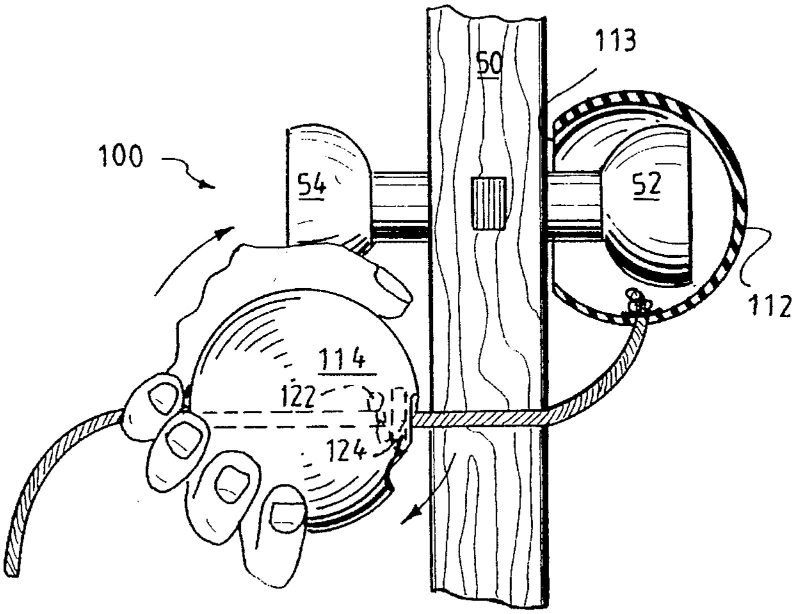
FIG. 10 is a broken side view of a door with the lock of FIG. 8 attached to and locking the door.

Turning now to FIGS. 9 and 10, the second embodiment 100 of the portable door lock of the invention operates as follows: The relatively large circular opening 113 of the hollow truncated exterior sphere 112 is placed over the exterior door knob 52 of door 50. The cord 116 and the interior sphere 114 are held near the interior door knob 54 and the door 50 is closed. The second washer 124 and the second knot 122 are, at this point, preferably located close to the interior surface of the door 50 and the cord 116 is preferably relatively taut relative to the exterior sphere 112. The interior sphere 114 is then moved along the cord 116 toward the door 50 and the keyhole 128 brought into engagement with the washer 124 in the same manner as described above with respect to the first embodiment. Those skilled in the art will appreciate that when the spheres 112, 114 are arranged in this manner, the exterior sphere 112 may not be removed from the exterior door knob 52 without breaking the lock 100. As mentioned above, the durability of the lock is selectable by choice of materials. For example, plastic spheres and/or a cord having a relatively low tensile strength will be easily broken by an adult and may only provide minimal security for a child visa vis another child. Metallic spheres with a high tensile strength cord may provide a relatively high level of security and may only be penetrable with the use of wire cutters or the like.

There have been described and illustrated herein several embodiments of a portable door lock. While particular embodiments of the invention have been described, it is not intended that the invention be limited thereto, as it is intended that the invention be as broad in scope as the art will allow and that the specification be read likewise. Thus, while particular materials have been disclosed, it will be appreciated that other materials could be utilized. Also, while spheres have been shown, it will be recognized that other types of interior and exterior members could be used with similar results obtained. Moreover, while particular configurations have been disclosed in reference to the cord and the stopping member, it will be appreciated that other configurations could be used as well. Furthermore, while the interior member has been disclosed as having keyhole, it will be understood that different stopping member engagement means can achieve the same or similar function as disclosed herein. It is also possible to adjust the portable lock for use with other movable enclosures, such as cabinet doors or windows.

It will therefore be appreciated by those skilled in the art that yet other modifications could be made to the provided invention without deviating from its spirit and scope as so claimed.

What is claimed is:

1. A removable door lock in combination with a door comprising:

a) an exterior member;

b) a cord having a first end and a second end, said first end being coupled to said exterior member;

c) an interior member slidably arranged on said cord so that it is movable along said cord toward and away from said exterior member;

said cord containing stopping means for stopping movement of said interior member in a direction away from said exterior member, said stopping means being located at a point on said cord between said first and second ends; and said interior member having means for selectively engaging said stopping member so that said interior member may be stopped by and released from said stopping member, wherein said exterior member is located on an exterior side of the door and said interior member is located on an interior side of the door, and after the door is closed, said interior member is slid along said cord toward the door and said means for selectively engaging said stopping member is brought into engagement with said stopping member.

2. A removable portable door lock according to claim 1, wherein:

said interior and exterior members are substantially spherical.

3. A removable portable door lock according to claim 2, wherein:

said interior member is substantially hollow and said means for selectively engaging said stopping member is a keyhole.

4. A removable portable door lock according to claim 3, wherein:

said stopping means includes a knot in said cord.

5. A removable portable door lock according to claim 4, wherein:

said stopping means includes a washer on said cord between said knot and said exterior member.

6. A removable portable door lock according to claim 1, wherein:

said cord is provided with a loop adjacent to said exterior member, said loop dimensioned to fit over a door knob for locating said exterior member on the exterior side of the door.

7. A removable portable door lock according to claim 1, wherein:

said exterior member is a substantially hollow truncated sphere which is dimensioned to fit over and substantially cover a door knob.

8. A removable portable door lock according to claim 1, wherein:

said second end of said cord is provided with means for stopping said interior member from sliding off said cord.

9. A removable portable door lock according to claim 8, wherein:

said means for stopping said interior member from sliding off said cord includes a knot.

10. A removable portable door lock according to claim 9, wherein:

said means for stopping said interior member from sliding off said cord includes a washer on said cord between said knot and said stopping means.

11. A removable portable lock in combination with a movable closure member of an enclosure comprising:

a) an exterior member;

b) a cord having a first end and a second end, said first end being coupled to said exterior member;

c) an interior member slidably arranged on said cord so that it is movable along said cord toward and away from said exterior member;

said cord containing stopping means for stopping movement of said interior member in a direction away from said exterior member, said stopping means being located at a point on said cord between said first and second ends; and said interior member having means for selectively engaging said stopping member so that said interior member may be stopped by and released from said stopping member, wherein said exterior member is located on an exterior side of the movable closure member and said interior member is located on an interior side of the movable closure member, and after the movable closure member is closed, said interior member is slid along said cord toward the movable closure member and said means for selectively engaging said stopping member is brought into engagement with said stopping member.

* * * * *